June 2, 1964  J. A. KOZEL  3,135,280

MIXING VALVE FOR AUTOMATIC WASHING MACHINE

Original Filed Sept. 9, 1959  2 Sheets-Sheet 1

INVENTOR
James A. Kozel
BY
*N. F. Johnston*
ATTORNEY

June 2, 1964           J. A. KOZEL           3,135,280
MIXING VALVE FOR AUTOMATIC WASHING MACHINE
Original Filed Sept. 9, 1959           2 Sheets-Sheet 2
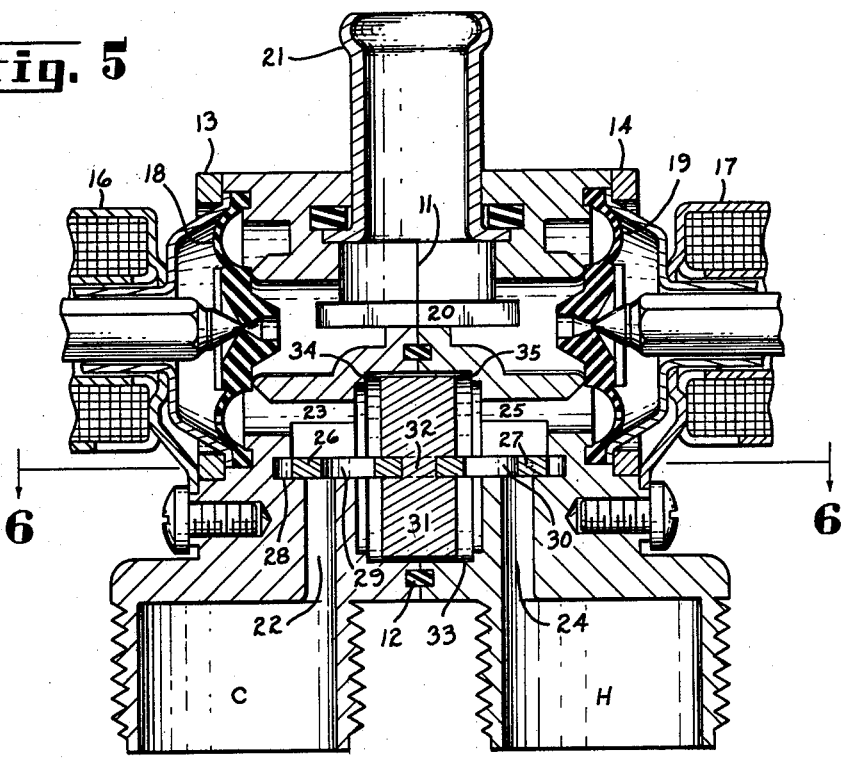
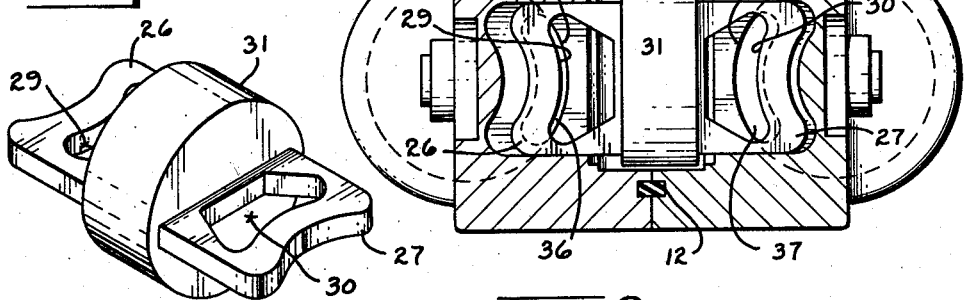
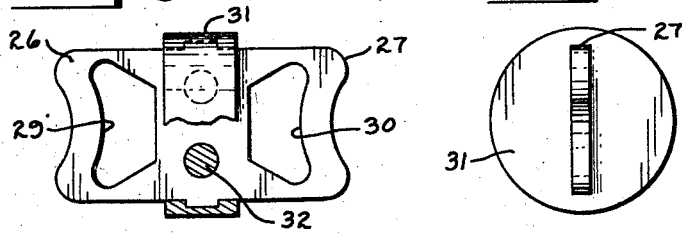
INVENTOR
James A. Kozel
BY *H. F. Johnston*
ATTORNEY ця
United States Patent Office 3,135,280
Patented June 2, 1964

---

3,135,280
MIXING VALVE FOR AUTOMATIC WASHING MACHINE
James A. Kozel, Franklin, Mich., assignor, by mesne assignments, to The Horton Company, Pittsburgh, Pa., a corporation of Pennsylvania
Continuation of application Ser. No. 838,882, Sept. 9, 1959. This application Apr. 5, 1962, Ser. No. 186,821
3 Claims. (Cl. 137—99)

My invention is an improved mixing valve for automatic washing machines.

This is a continuation of my application No. 838,882 filed September 9, 1959, entitled "Mixing Valve for Automatic Washing Machine."

In the simpler types of mixing valves commonly used in automatic washing machines, a pair of solenoid valves is provided for opening either the cold water passage, the hot water passage or both at the same time. When both valves are open, so-called tempered water is delivered to the machine and if the pressure at the hot and cold water inlets is exactly the same, the valve will supply the water at the desired temperature. However, due to the fact that the hot water must pass through a water tank and through pipes which may be corroded, it may come to the washing machine at less pressure than the cold water and, of course, there may be other conditions where the hot water pressure might be lower than the cold water. Conversely, conditions could exist where the hot water pressure is greater than the cold water pressure. Under such conditions, the temperature of the water when both hot and cold solenoid valves are open is uncertain.

While pressure regulators or equalizers have been proposed for various purposes, the general object of my invention is to provide a sensitive and effective, and yet low cost pressure equalizing device incorporated in a simple compact arrangement in the same valve body which carries the inlets, outlets and solenoid valves.

A further object is to provide an improved pressure equalizing device which is free-floating and therefore, unlikely to stick and become useless, while at the same time, providing means to insure that hot water will not pass by the equalizing device when only the cold water solenoid is opened and vice versa.

Another object is to provide for the valve a casing that is divided in the middle and with both ends of identical construction.

In the accompanying drawings, I have shown for purpose of illustration, one embodiment which the invention may assume in practice. In the drawings:

FIGURE 5 is a vertical cross-section through my improved mixing valve with the pressure equalizer in mid-position;

FIGURE 6 is a horizontal section on line 6—6 of FIGURE 5 showing a slightly different position of the equalizer throttle valves;

FIGURE 7 is a perspective view of the throttle valve member;

FIGURE 8 is a plan view of the same with a portion broken away;

FIGURE 9 is an end view of the same; and,

Figure 1:
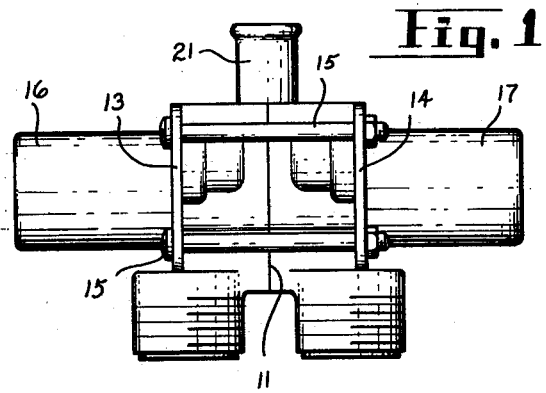
FIGURE 1 is a front elevational view of the mixing valve.

The valve body comprises two separate halves divided along the center line 11, one carrying the cold water inlet C and the other the hot water inlet H. A gasket 12 is fitted between the halves of the valve body and they are held together by end plates 13 and 14 and the bolts 15. At opposite ends of the valve body and held in place by the plates 13 and 14 are the cold and hot water solenoid valves 16 and 17 respectively.

Since the specific construction of these valves forms no part of the present invention, they need not be further described except that they are independently operable and have the diaphragms 18 and 19 seating against the ends of the mixing chamber 20 for separately controlling admission of hot and cold water to the mixing chamber from which it can be delivered to the washing machine through an outlet fitting 21.

The cold water passageway has an arcuately shaped bottom portion 22 and an upper portion 23 which leads to the space around the diaphragm valve 18. Likewise, the hot water passageway has an arcuately shaped bottom portion 24 and an upper portion 25 leading to the diaphragm valve 19.

Figure 3:
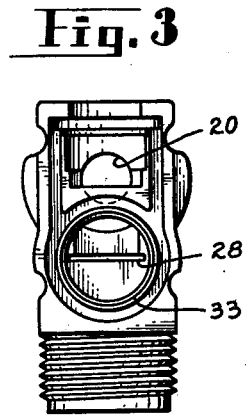
FIGURE 3 is an end view of half of the valve body.
Figure 2:
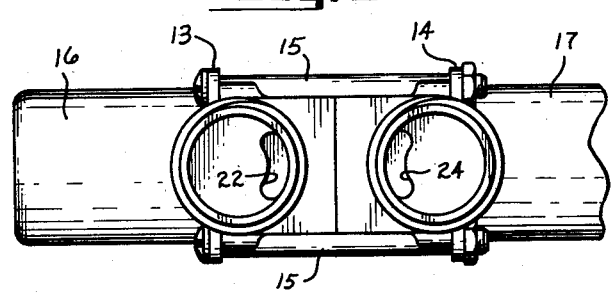
FIGURE 2 is a bottom plan view.
Figure 4:
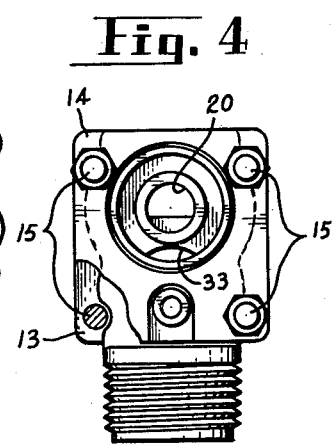
FIGURE 4 is an end view of the valve with the solenoid removed and a part of the end plate broken away.

The pressure equalizer device or throttle valve is mounted in the two-piece valve body between the inlets and mixing chamber so as to throtle one or the other of the passageways dependent on variations in the hot and cold water pressures. The equalizing device utilizes a simple free-floating throttle valve member with one end 26 controlling the cold water and the opposite end 27 controlling the hot water. This may be termed a slide valve or flat metering plate and it is supported in its travel in guide grooves 28 which may be molded in the valve body and which can be seen in end view in FIGURE 3. It may be noted that the throttle valve member operates like a sluice gate, in the sense that it is located in midstream to regulate flow; it minimizes the friction effects of varying inlet pressures, so that its position is affected only by the pressures acting on the piston 31.

The cold water end of the pressure equalizing or throttle valve has the opening 29 with an arcuate edge which is complementary to the shape of the bottom passage 22 and the other end of the valve has a similar opening 30 adapted to register with the passageway 24.

The plate-like portion of the valve is preferably formed of metal, and attached to the same is the piston 31 which may be molded around the metal plate with interengaging portions 32 extending through holes in the plate. The piston loosely fits inside the cylinder 33 which is formed half in one side of the valve body with the other half in the other side. This combined slideable piston and valve construction is very economical to manufacture and assemble as compared, for example, with an arrangement utilizing a diaphragm as the pressure sensing element.

It is clear from FIGURE 5 that the opposite ends of this pressure sensing cylinder are in direct communication with the upper portions of the hot and cold water passageways 23 and 25 respectively.

At opposite ends of the cylinder are shoulders 34 and 35 which serve as seats against which the piston moves at opposite ends of its travel. Thus while the piston has a free-fit in the cylinder so as to be sensitive at all times to differences in pressure, it will seat at either end against one of the shoulders to prevent leakage around the piston when it is at either of its limiting positions. This will prevent re-circulation of hot water to cold water or vice versa when the diaphragm valves 17 and 18 are closed and water is not flowing.

The mode of operation of my improved mixing valve will now be readily understood.

If we assume that the pressures in the hot and cold water inlets are equal and the hot and cold water solenoid valves 16 and 17 are both open, hot and cold water will flow through the ports 29 and 30 at equal rates and the piston 31 will be subjected to equal pressures on opposite sides so that it will assure a central position.

Now, if the cold water pressure is the higher of the two, then the differences in pressure will move the piston toward the right until the equalizer or throttle valve assumes some such position as shown in FIGURE 6 where the cold water is throttled so that it flows only through the narrower valve opening 36 while the hot water valve opening is correspondingly widened as indicated at 37. The extent of the movement will, of course, be dependent upon the amount of the difference in pressure but the simultaneously throttling of the cold water and opening of the hot water will equalize the pressures in the upper parts of the passageways 23 and 25 until the piston assumes a stable condition. Thus, in all cases, the water pressure flowing through the solenoid valves into the mixing chamber will be equal and thus the desired temperature of the water is assured. If the hot water pressure were greater, the action will be the same with the throttle valve member assuming a position to the left of the central position.

Figure 10:
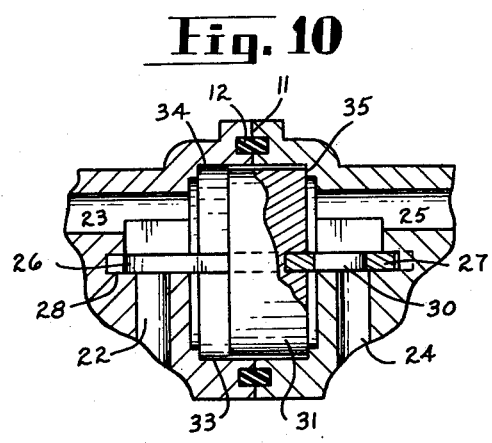
FIGURE 10 is a partial vertical section showing one of the limiting positions of the throttle valves.

When only one of the solenoid valves is open as when only hot or cold water is demanded, then the equalizer valve is automatically shifted to one side or the other. In FIGURE 10, it is shown as being shifted to the right to substantially close off the cold water port and open wide the hot water port. Since the cold water solenoid valve is closed even the small flow through the substantially closed throttle valve, or leakage around the left-hand end of the valve will subject the left side of the piston to the full cold water pressure. Since water is flowing freely to the hot water side, the pressure on the right side of the piston will be less, therefore, the piston moves to its limiting position where it is seated against the shoulder 35, thus preventing leakage of cold water around the piston into the mixing chamber. The reverse situation will obtain, when only cold water is desired with the throttle valves and piston shifted to the left.

What I claim is:

1. An improved hot and cold water mixing valve for automatic washing machines which comprises, a valve body having a mixing chamber, hot and cold water inlets, selectively operable valves for controlling the admission of hot and cold water to said mixing chamber, separate passageways leading from said hot and cold water inlets to said valves, a pressure equalizing device mounted in said valve body and comprising a valve member having a throttling valve extending across each of said passageways and movable in one direction to progressively throttle the hot water passageway while progressively opening the cold water passageway and in the opposite direction to progressively throttle the cold water passageway and progressively open the hot water passageway, a cylinder communicating at opposite ends with said hot and cold water passageways on the down-stream side of said throttling valve, a pressure-sensing piston freely fitting in said cylinder and attached to said throttling valve, means providing a seat at each end of the cylinder against which the piston moves at either end of its travel to prevent flow of water around the piston, and said valve member being supported along substantially its entire length in guide grooves formed in the valve body.

2. An improved cold and hot water mixing valve as defined in claim 1 wherein, said valve body consists essentially of two substantially identical molded pieces clamped together in a contiguous relationship with the divided plane between said two pieces passing through said cylinder perpendicular to the axis of movement of said piston therein.

3. An improved hot and cold water mixing valve suitable for automatic washing machines which comprises, a valve body having a mixing chamber, hot and cold water inlets, selectively operable valves for controlling the admission of hot and cold water to said mixing chamber, separate passageways leading from said hot and cold water inlets to said valves, a pressure equalizing device comprising a pressure-sensing piston portion and plate-like throttling valve portions projecting from opposite ends thereof and extending across each of said passageways, a cylinder wall in said valve body communicating at its opposite ends with said passageways on the down-stream side of said throttling valve portions and operatively positioning said piston portion for back and forth guided movement towards a closing-off position with respect to one of said passageways in its forward movement and towards a closing-off position with respect to the other of said passageways in its backward movement, said piston portion moving said throttling valve portions in one direction to progressively throttle the hot water passageway while progressively opening the cold water passageway and in the opposite direction to progressively throttle the cold water passageway while progressively opening the hot water passageway, said piston portion having a loose-floating fit within said cylinder wall, and means adjacent opposite ends of said cylinder wall against which said piston moves at opposite ends of its back and forth movement therein for preventing flow of water around said piston.

References Cited in the file of this patent

UNITED STATES PATENTS

| | | |
|---|---|---|
| 806,271 | Manning | Dec. 5, 1905 |
| 862,867 | Eggleston | Mar. 28, 1906 |
| 962,111 | Assmann | June 21, 1910 |
| 990,557 | Holmen | Apr. 25, 1911 |
| 1,780,589 | Hendrix | Nov. 4, 1930 |
| 2,009,102 | Bern | July 23, 1935 |
| 2,200,578 | Mahon | May 14, 1940 |